(12) United States Patent
Loc et al.

(10) Patent No.: US 9,088,553 B1
(45) Date of Patent: *Jul. 21, 2015

(54) TRANSMITTING MESSAGE PRIOR TO TRANSMITTING ENCAPSULATED PACKETS TO ASSIST LINK PARTNER IN DECAPSULATING PACKETS

(71) Applicant: Marvell International Ltd., Hamilton (BM)

(72) Inventors: Peter Loc, Cupertino, CA (US); Rahul Kopikare, Livermore, CA (US)

(73) Assignee: Marvell International LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,760

(22) Filed: Oct. 31, 2013

Related U.S. Application Data

(63) Continuation of application No. 13/533,567, filed on Jun. 26, 2012, now Pat. No. 8,577,037, which is a continuation of application No. 12/758,865, filed on Apr. 13, 2010, now Pat. No. 8,208,632, which is a continuation of application No. 10/974,388, filed on Oct. 27, 2004, now Pat. No. 7,697,688.

(51) Int. Cl.
*H04L 9/28* (2006.01)
*H04L 9/32* (2006.01)
(Continued)

(52) U.S. Cl.
CPC .............. *H04L 63/068* (2013.01); *H04W 12/04* (2013.01); *H04L 63/0457* (2013.01)

(58) Field of Classification Search
CPC ....... H04L 9/08; H04L 9/0861; H04L 9/0866; H04L 9/0869; H04L 9/0891; H04L 63/06; H04L 63/068; H04L 63/0457; H04L 63/0428; H04L 2463/061; H04W 12/04
USPC ............. 380/28, 44, 260, 262, 270, 273, 274; 713/168, 170
See application file for complete search history.

(56) References Cited

U.S. PATENT DOCUMENTS 5,999,629 A 12/1999 Heer et al.
6,438,235 B2 8/2002 Sims, III
(Continued)

OTHER PUBLICATIONS

IEEE P802.11i, IEEE Standard for Information technology—Telecommunications and information exchange between systems—Local and metropolitan area networks—Specific requirements; Part 11: Wireless Medium Access Control (MAC) and Physical Layer (PHY); specifications: Amendment 6: Medium Access Control (MAC) Security Enhancements,; Apr. 2004, pp. 1-171.

(Continued)

*Primary Examiner* — Zachary A Davis

(57) ABSTRACT

A network device includes a first circuit configured to generate a plurality of packets, and insert, in each of the plurality of packets, a different value for a count. A second circuit receives one or more of the plurality of packets. A third circuit generates a plurality of seeds. Each of the plurality of seeds is based on (i) a predetermined key, (ii) an address of the network device, and (iii) a predetermined value for the count. A fourth circuit encapsulates each of the plurality of packets using one of the plurality of seeds generated based on the value for the count in the respective one of the plurality of packets. A fifth circuit sends a message comprising (i) the address of the network device and (ii) the predetermined value for the count, and sends, subsequent to sending the message, the plurality of encapsulated packets.

18 Claims, 5 Drawing Sheets

(51) Int. Cl.
*H04K 1/00* (2006.01)
*H04L 9/00* (2006.01)
*H04L 29/06* (2006.01)
*H04W 12/04* (2009.01)

(56) References Cited

U.S. PATENT DOCUMENTS

| | | | |
|---|---|---|---|
| 6,550,011 B1 | 4/2003 | Sims, III | |
| 6,683,954 B1 | 1/2004 | Searle | |
| 6,965,674 B2 | 11/2005 | Whelan et al. | |
| 7,245,724 B1 | 7/2007 | Chesson et al. | |
| 7,350,077 B2 | 3/2008 | Meier et al. | |
| 7,380,135 B2 | 5/2008 | Nishimoto et al. | |
| 7,697,688 B1 * | 4/2010 | Loc et al. | 380/262 |
| 7,742,594 B1 | 6/2010 | Loc et al. | |
| 8,208,632 B1 * | 6/2012 | Loc et al. | 380/262 |
| 8,229,110 B1 | 7/2012 | Loc et al. | |
| 8,577,037 B1 * | 11/2013 | Loc et al. | 380/262 |
| 8,631,233 B1 * | 1/2014 | Loc et al. | 713/160 |
| 2004/0034785 A1 | 2/2004 | Tai et al. | |
| 2004/0083362 A1 | 4/2004 | Park et al. | |
| 2004/0142710 A1 | 7/2004 | Liang | |
| 2004/0202317 A1 | 10/2004 | Demjanenko et al. | |
| 2005/0172119 A1 | 8/2005 | Eckhardt et al. | |
| 2005/0278548 A1 | 12/2005 | Lin et al. | |

OTHER PUBLICATIONS

IEEE 802.20-PD-06 (Jul. 16, 2004) 24 pages); Draft 802.20 Permanent Document; System; Requirements for IEEE 802.20 Mobile Broadband Wireless Access Systems—Version 14.

IEEE Standard 802.11 (1999 Edition; 542 pages); IEEE Standard for Information Technology; Telecommunications and Information Exchange Between Systems; Local and Metropolitan Area Networks; Specific Requirements; Part 11: Wireless LAN Medium; Access Control (MAC) and Physical Layer (PHY) Specifications.

IEEE Standard 802.11a (1999 Edition; Amended 2000; 92 pages); Supplement to IEEE; Standard for Information Technology; Telecommunications and Information Exchange; Between Systems; Local and Metropolitan Area Networks; Specific Requirements; Part 11: Wireless LAN Medium Access Control (MAC) and Physical Layer (PHY) Specifications; High-Speed Physical Layer in the 5 GHz Band.

IEEE Standard 802.11b (Sep. 16, 1999 Edition) 96 pages); Supplement to IEEE; Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Higher-Speed Physical Layer Extension ni the 2.4 GHz Band.

IEEE Standard P802.11g, Draft Supplement to Standard for Information technology—Telecommunications and information exchange between systems—Local and metropolitan; area networks—Specific requirements, Part 11: Wireless LAN Medium Access Control; (MAC) and Physical Layer (PHY) specifications: Further Higher Data Rate Extension in the; 2.4 GHz Band, Apr. 2003, pp. 1-69.

IEEE Std. 802.16; IEEE Standard for Local and metropolitan area networks; Part 16: Air; Interface for Fixed Broadband Wireless Access Systems; Apr. 8, 2002; pp. 1-322.

IEEE 802.16, IEEE Standard for Local and Metropolitan Area Networks; Part 16: Air Interface for Fixed Broadband Wireless Access Systems, 802.16 IEEE Standard for Local and Metropolitan Area Networks, Oct. 1, 2004, pp. i-xxxiv and pp. 1-857, IEEE Std.; 802.16-2004, IEEE, United States.

802.11n; IEEE P802.11-04/0889r6; Wireless LANs, TGn Sync Proposal Technical Specification; May 2005; 131 pages.

* cited by examiner

US 9,088,553 B1

TRANSMITTING MESSAGE PRIOR TO TRANSMITTING ENCAPSULATED PACKETS TO ASSIST LINK PARTNER IN DECAPSULATING PACKETS

CROSS-REFERENCE TO RELATED APPLICATIONS

This is a continuation of U.S. patent Ser. No. 13/533,567, filed on Jun. 26, 2012, which is a continuation of U.S. patent application Ser. No. 12/758,865 (now U.S. Pat. No. 8,208,632), filed on Apr. 13, 2010, which is a continuation of U.S. patent application Ser. No. 10/974,388 (now U.S. Pat. No. 7,697,688), filed on Oct. 27, 2004, which is related to U.S. patent application Ser. No. 10/974,458 (now U.S. Pat. No. 7,742,594), filed on Oct. 27, 2004. The entire disclosures of the above applications are incorporated herein by reference.

BACKGROUND

The present invention relates generally to encapsulation and decapsulation of data communications packets. More particularly, the present invention relates to pipelining such encapsulation and decapsulation to achieve faster data throughput.

Network devices operating in a wireless local-area network (WLAN) may employ the Temporal Key Integrity Protocol (TKIP) specified by the IEEE 802.11i standard (April 2004) to protect the confidentiality and integrity of transmitted data from malicious attacks.

According to TKIP, the sender encapsulates packets of data to be sent using a temporal key negotiated with the receiver. The receiver, upon receiving the packets, decapsulates the packets using the temporal key. This scheme works well as long as the transmitted packets are separated by inter-packet gaps that are large enough to allow the receiver to complete the decapsulation of one packet before the next packet arrives.

However, in WLAN applications that require very high throughput, data packets are transmitted in succession with no inter-packet gaps. In addition, in IEEE 802.11n Multiple Input Multiple Output (MIMO) systems, data packets are transmitted at even higher data rates, leaving even less time for decapsulation.

SUMMARY

In general, in one aspect, the invention features an apparatus and corresponding method and computer program for processing N encapsulated Media Access Control (MAC) Payload Data Units (MPDUs), wherein $N \geq 1$. It comprises a key mixing circuit to generate N Wired Equivalent Privacy (WEP) seeds each based upon a predetermined temporal key, a transmitter MAC address, and a predetermined start value for a Temporal Key Integrity Protocol (TKIP) Sequence Count (TSC); an input circuit to receive the N encapsulated MPDUs, wherein each of the N encapsulated MPDUs comprises the transmitter MAC address and one of N values for the TSC, wherein each of the N values for the TSC is greater than, or equal to, the predetermined start value for the TSC; and a WEP decapsulation circuit to decapsulate each of the encapsulated MPDUs using the one of the N WEP seeds that was generated based on the value for the TSC in the respective one of the N encapsulated MPDUs; wherein the key mixing circuit generates each of the N WEP seeds before the input circuit receives the respective one of the N encapsulated MPDUs.

Particular implementations can include one or more of the following features. The input circuit receives a message comprising the transmitter MAC address and the predetermined start value for the TSC before the key mixing circuit generates the N WEP seeds. The message further comprises the value of N. Particular implementations can include a reassembly circuit to reassemble one or more MAC Service Data Units (MSDUs) based on the N decapsulated MPDUs. Particular implementations can include a verification circuit to verify each of the MSDUs using a Message Integrity Code (MIC) key. Particular implementations can include a countermeasures circuit to employ one or more countermeasures when any of the MSDUs cannot be verified. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for processing N encapsulated packets of data, wherein $N \geq 1$. It comprises a key mixing circuit to generate N decapsulation seeds each based upon a predetermined temporal key, a transmitter address, and a predetermined start value for a count; an input circuit to receive the N encapsulated packets, wherein each of the N encapsulated packets comprises the transmitter address and one of N values for the count, wherein each of the N values for the count is greater than, or equal to, the predetermined start value for the count; and a decapsulation circuit to decapsulate each of the encapsulated packets of data using the one of the N decapsulation seeds that was generated based on the value for the count in the respective one of the N encapsulated packets of data; wherein the key mixing circuit generates each of the N decapsulation seeds before the input circuit receives the respective one of the N encapsulated packets of the data.

Particular implementations can include one or more of the following features. The input circuit receives a message comprising the transmitter address and the predetermined start value for the count before the key mixing circuit generates the N decapsulation seeds. The message further comprises the value of N. Particular implementations can include a verification circuit to verify each of the N decapsulated packets using an integrity code key. Particular implementations can include a countermeasures circuit to employ one or more countermeasures when any of the N decapsulated packets cannot be verified. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N Media Access Control (MAC) Payload Data Units (MPDUs), wherein $N \geq 1$. It comprises a key mixing circuit to generate N Wired Equivalent Privacy (WEP) seeds each based upon a predetermined temporal key, a transmitter MAC address, and a predetermined start value for a Temporal Key Integrity Protocol (TKIP) Sequence Count (TSC); an input circuit to receive one or more MAC Service Data Units (MSDUs); a fragmentation circuit to generate the N MPDUs based on the one or more MSDUs, and to insert a different one of N values for the TSC into each of the N MPDUs, wherein each of the N values for the TSC is greater than, or equal to, the predetermined start value for the TSC; a WEP encapsulation circuit to encapsulate each of the N MPDUs using the one of the N WEP seeds that was generated based on the value for the TSC in the respective one of the N MPDUs; and an output circuit to send the N encapsulated MPDUs; wherein the key mixing circuit generates each of the N WEP seeds before the input circuit receives the one or more MSDUs.

Particular implementations can include one or more of the following features. The output circuit sends a message comprising the transmitter address and the predetermined start value for the TSC before sending the N encapsulated MPDUs. The message further comprises the value of N. Particular implementations can include an integrity circuit to generate a Message Integrity Code (MIC) for each of the MSDUs using a MIC key, and to insert each MIC into a respective one of the MSDUs before the fragmentation circuit generates the N MPDUs. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N packets of data, wherein $N \geq 1$. It comprises a key mixing circuit to generate N encapsulation seeds each based upon a predetermined temporal key, a transmitter address, and a predetermined start value for a count; an input circuit to receive the N packets of data; a count circuit to insert a different one of N values for the count into each of the N packets of data, wherein each of the N values for the count is greater than, or equal to, the predetermined start value for the count; an encapsulation circuit to encapsulate each of the N packets of data using the one of the N encapsulation seeds that was generated based on the value for the count in the respective one of the N packets of data; and an output circuit to send the N encapsulated packets of data; wherein the encapsulation circuit generates each of the N encapsulation seeds before the input circuit receives the respective one of the N packets of data.

Particular implementations can include one or more of the following features. The output circuit sends a message comprising the transmitter address and the predetermined start value for the count before sending the N encapsulated packets of data. The message further comprises the value of N. Particular implementations can include an integrity circuit to generate an integrity code for each of the N packets of data using an integrity key, and to insert each integrity code into a respective one of the N packets of data before the encapsulation circuit encapsulates the respective one of the N packets of data. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N Media Access Control (MAC) Payload Data Units (MPDUs), wherein $N \geq 1$. It comprises an output circuit to send a message comprising a transmitter MAC address and a predetermined start value for a Temporal Key Integrity Protocol (TKIP) Sequence Count (TSC); a fragmentation circuit to insert a different one of N values for the TSC into each of the N MPDUs, wherein each of the N values for the TSC is greater than, or equal to, the predetermined start value for the TSC; a key mixing circuit to generate N Wired Equivalent Privacy (WEP) seeds each based upon a predetermined temporal key, the transmitter MAC address and one of the N values for the TSC; a WEP encapsulation circuit to encapsulate each of the N MPDUs using the one of the N WEP seeds that was generated based on the value for the TSC in the respective one of the N MPDUs; wherein the output circuit sends the N encapsulated MPDUs after sending the message.

Particular implementations can include one or more of the following features. The fragmentation circuit generates the N MPDUs based on one or more MAC Service Data Units (MSDUs). Particular implementations can include an integrity circuit to generate a Message Integrity Code (MIC) for each of the MSDUs using a MIC key and insert each MIC into a respective one of the MSDUs before the fragmentation circuit generates the MPDUs based on the respective one of the MSDUs. The message further comprises the value of N. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N packets of data, wherein $N \geq 1$. It comprises an output circuit to send a message comprising a transmitter address and a predetermined start value for a count; an insertion circuit to insert a different one of N values for the count into each of the N packets of data, wherein each of the N values for the count is greater than, or equal to, the predetermined start value for the count; a key mixing circuit to generate N encapsulation seeds each based upon a predetermined temporal key, the transmitter address and one of the N values for the count; an encapsulation circuit to encapsulate each of the N packets of data using the one of the N encapsulation seeds that was generated based on the value for the count in the respective one of the N packets of data; wherein the output circuit sends the N encapsulated packets of data after sending the message.

Particular implementations can include one or more of the following features. Particular implementations can include an integrity circuit to generate a Message Integrity Code (MIC) for each of the N packets of data using a MIC key and insert each MIC into a respective one of the N packets of data before the encapsulation circuit encapsulates the respective one of the N packets of data. The message further comprises the value of N. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features a packet comprising Temporal Key Integrity Protocol (TKIP) Sequence Count (TSC) information representing a number N of Media Access Control (MAC) Payload Data Units (MPDUs) encapsulated according to TKIP to be transmitted following the packet, wherein $N \geq 1$; a transmitter MAC address for a transmitter of the N encapsulated MPDUs; and a receiver MAC address for a receiver of the N encapsulated MPDUs.

Particular implementations can include one or more of the following features. The TSC information comprises a predetermined start value for the TSC, wherein each of the N encapsulated MPDUs comprises a value for the TSC that is greater than, or equal to, the predetermined start value for the TSC; and a predetermined range value representing a range of values of the TSC in the N encapsulated MPDUs.

In general, in one aspect, the invention features a packet comprising count information representing a number N of encapsulated packets to be transmitted following the packet, wherein N≥1; a transmitter address for a transmitter of the N encapsulated packets; and a receiver address for a receiver of the N encapsulated packets.

Particular implementations can include one or more of the following features. The count information comprises a predetermined start value for the count, wherein each of the N encapsulated packets comprises a value for the count that is greater than, or equal to, the predetermined start value for the count; and a predetermined range value representing a range of values of the count in the N encapsulated packets.

The details of one or more implementations are set forth in the accompanying drawings and the description below. Other features will be apparent from the description and drawings, and from the claims.

Figure 1:
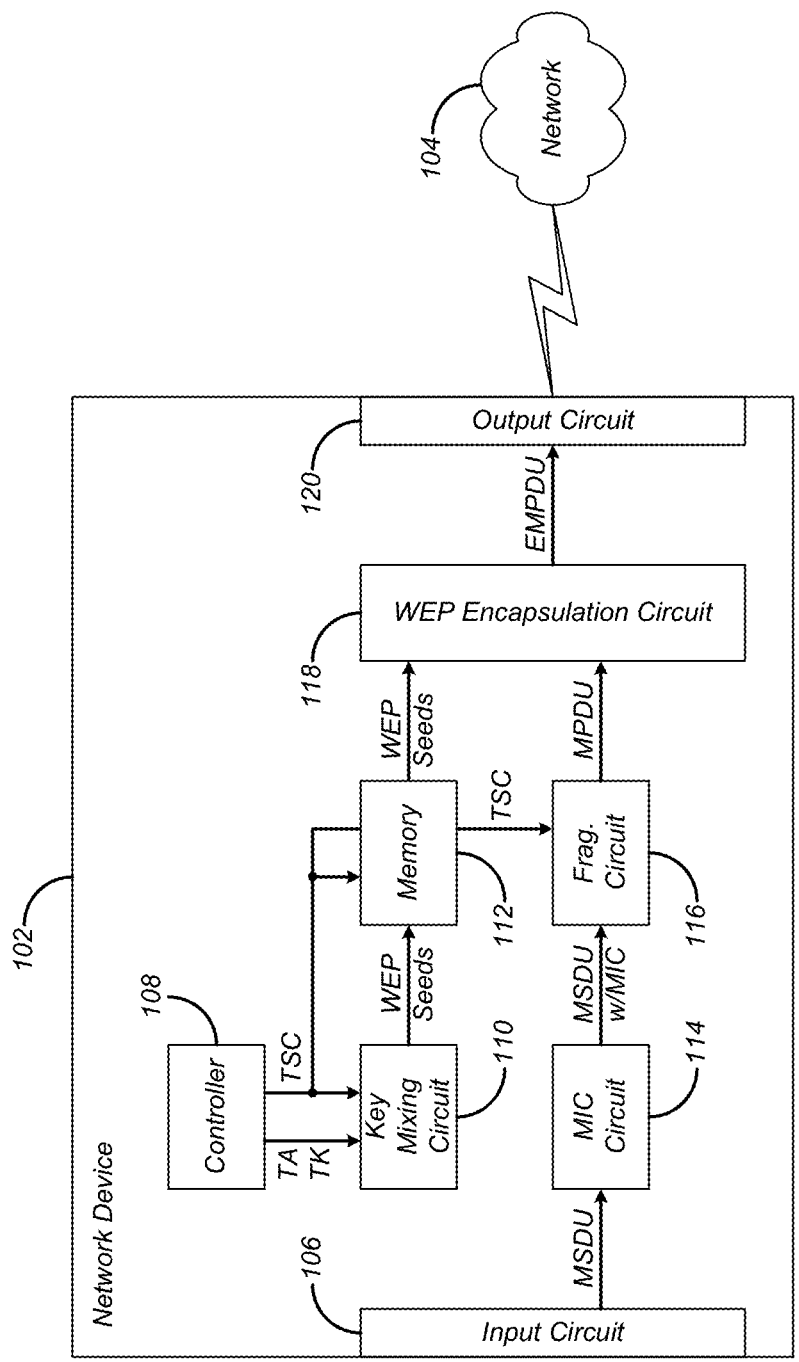
FIG. 1 shows a network device in communication with a network such as a wireless local-area network (WLAN) according to a preferred embodiment.

The leading digit(s) of each reference numeral used in this specification indicates the number of the drawing in which the reference numeral first appears.

DETAILED DESCRIPTION

Embodiments of the present invention employ pipelining strategies that allow encapsulation and decapsulation of packets in two stages, one of which is implemented for each packet before the packet is received. These pipelining approaches significantly reduce the time required to encapsulate and decapsulate a series of packets.

The two stages are encapsulation seed generation and encapsulation or decapsulation. When certain parameters for the packets to be received are known or assumed in advance, the encapsulation seeds for the packets can be generated before receiving the packets. Therefore the packets can be encapsulated or decapsulated immediately upon arrival, rather than after the time-consuming encapsulation seed generation process.

Embodiments of the present invention are described with respect to the Temporal Key Integrity Protocol (TKIP) and Arcfour algorithm specified by the IEEE 802.11i standard (April 2004). However, as will be apparent to one skilled in the relevant arts after reading this description, the techniques disclosed herein are equally applicable to other sorts of encapsulation and encryption protocols, and to wired networks as well as wireless networks.

FIG. 1 shows a network device 102 in communication with a network 104 such as a wireless local-area network (WLAN) according to a preferred embodiment. Network device 102 comprises an input circuit 106, a controller 108, a key mixing circuit 110, a memory 112, a Message Integrity Code (MIC) circuit 114, a fragmentation circuit 116, a WEP encapsulation circuit 118, and an output circuit 120. According to some embodiments, network device 102 is compliant with IEEE standards 802.11i (April 2004), and is otherwise compliant with one or more of IEEE standards 802.11 (1999 Edition), 802.11a (1999 Edition; Amended 2000), 802.11b (16 Sep. 1999 Edition), 802.11g (April 2003), 802.11n, 802.16 (2004), and 802.20-PD-06 (Jul. 16, 2004), the disclosures thereof incorporated herein by reference in their entirety.

Figure 2:
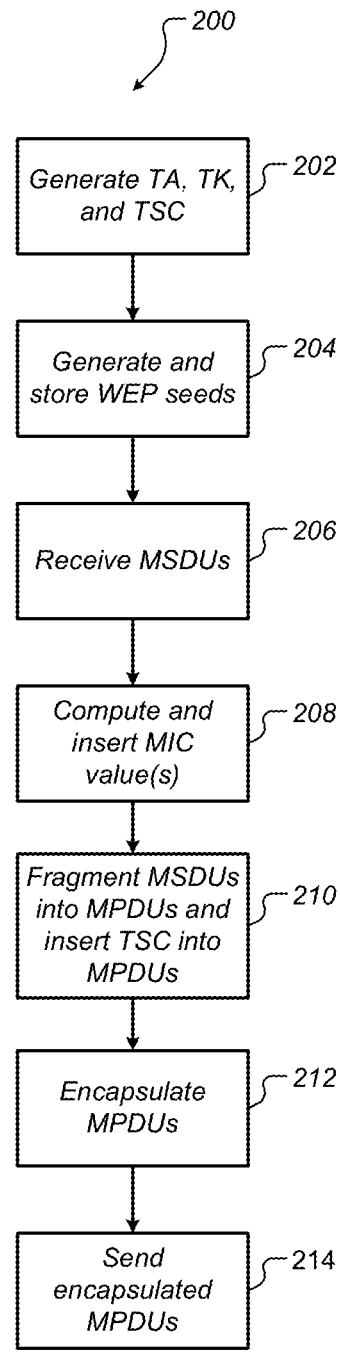
FIG. 2 shows a pipelined two-stage encapsulation and transmission process for network device of FIG. 1 according to a preferred embodiment.

FIG. 2 shows a pipelined two-stage encapsulation and transmission process 200 for network device 102 of FIG. 1 according to a preferred embodiment. In the second of the two stages, each of N Media Access Control (MAC) Payload Data Units (MPDUs) is encapsulated using one of N Wired Equivalent Privacy (WEP) seeds. The first stage of the process generates the N WEP seeds ahead of time so they are ready when the second stage begins.

Referring to FIG. 2, controller 108 provides a transmitter MAC address TA, a temporal key TK, and at least a start value for a Temporal Key Integrity Protocol (TKIP) Sequence Count (TSC) to key mixing circuit 110 (step 202). The transmitter MAC address TA is a MAC address for network device 102. The temporal key TK is a key that is negotiated in advance by network device 102 and an intended receiver, as is well-known in the relevant arts. The TSC is a counter for the MPDUs to ensure sequential reception at the intended receiver, as described in detail below.

Key mixing circuit 110 generates each of the N WEP seeds based upon temporal key TK, transmitter MAC address TA, and the start value for TSC, and stores the N WEP seeds in memory 112 (step 204). Preferably key mixing circuit 110 generates a WEP seed for each of N sequential values of TSC beginning with the start value provided by controller 108, although other methods could be used. The start value for TSC is preferably initialized to one (TSC=1) during initialization of network device 102, and is incremented for each WEP seed generated.

Input circuit 106 subsequently receives one or more MAC Service Data Units (MSDUs) (step 206), for example from a host unit or processor within network device 102. MIC circuit 114 computes a MIC value for each MSDU based upon a MIC key, and inserts the MIC value into the respective MSDU (step 208) according to methods well-known in the relevant arts.

Fragmentation circuit 116 fragments the MSDUs to produce the N MPDUs, and inserts a value for TSC into each MPDU so the MPDUs are numbered sequentially (step 210). Each of the N values for the TSC is greater than, or equal to, the start value for the TSC.

WEP encapsulation circuit 118 encapsulates each of the N MPDUs using the one of the N WEP seeds that was generated based on the value for the TSC in the respective one of the N MPDUs (step 212). For example, WEP encapsulation circuit 118 receives a MPDU from fragmentation circuit 116 and the corresponding WEP seed from memory 112, and performs the encapsulation according to methods well-known in the relevant arts to produce an encapsulated MPDU (EMPDU).

Output circuit 120 sends the N EMPDUs (step 214). For example, output circuit 120 can comprise a wireless physical-layer device (PHY) and antenna. As another example, output circuit 120 can be a MAC output circuit that provides the EMPDUs to a separate PHY and antenna for transmission to network 104.

According to process 200, key mixing circuit 110 generates each of the N WEP seeds before input circuit 106 receives the MSDUs. Therefore each WEP seed is available when the corresponding MPDU arrives at WEP encapsulation circuit 118. This pipelining process ensures that no time is wasted in waiting for a WEP seed to be generated after receiving the corresponding MSDU.

Figure 3:
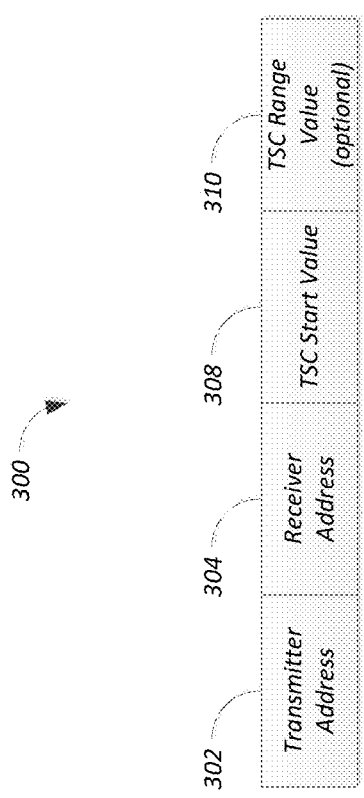
FIG. 3 shows the format of a pipelining setup message according to a preferred embodiment.

In some embodiments, network device 102 generates and sends a pipelining setup message containing information describing the N MPDUs before sending the MPDUs. The pipelining setup message can be used by the intended recipient to pipeline the decapsulation process, as described in detail below. Network device 102 can generate and send the pipelining setup message either with or without performing the pipelining process 200 described above. FIG. 3 shows the format of a pipelining setup message 300 according to a preferred embodiment.

Pipelining setup message 300 preferably comprises a transmitter address 302, a receiver address 304, a TSC start value 308, and an optional TSC range value 310. Transmitter address 302 is preferably the 6-byte MAC address of network device 102. Receiver address 304 is preferably the 6-byte MAC address of a wireless receiver, such as a wireless access point, in network 104.

TSC start value 308 is the 6-byte value of TSC for the first of the N MPDUs to be sent. TSC range value 310 is a 1-byte value representing the number N of MPDUs to be sent. Of course, the TSC information can be represented in other ways in pipelining setup message 300. For example, instead of including the start value and range for TSC, the TSC information could comprise the end value and range, the start and end values, or any other parameters that can be used to calculate the start and range values of TSC.

Figure 4:
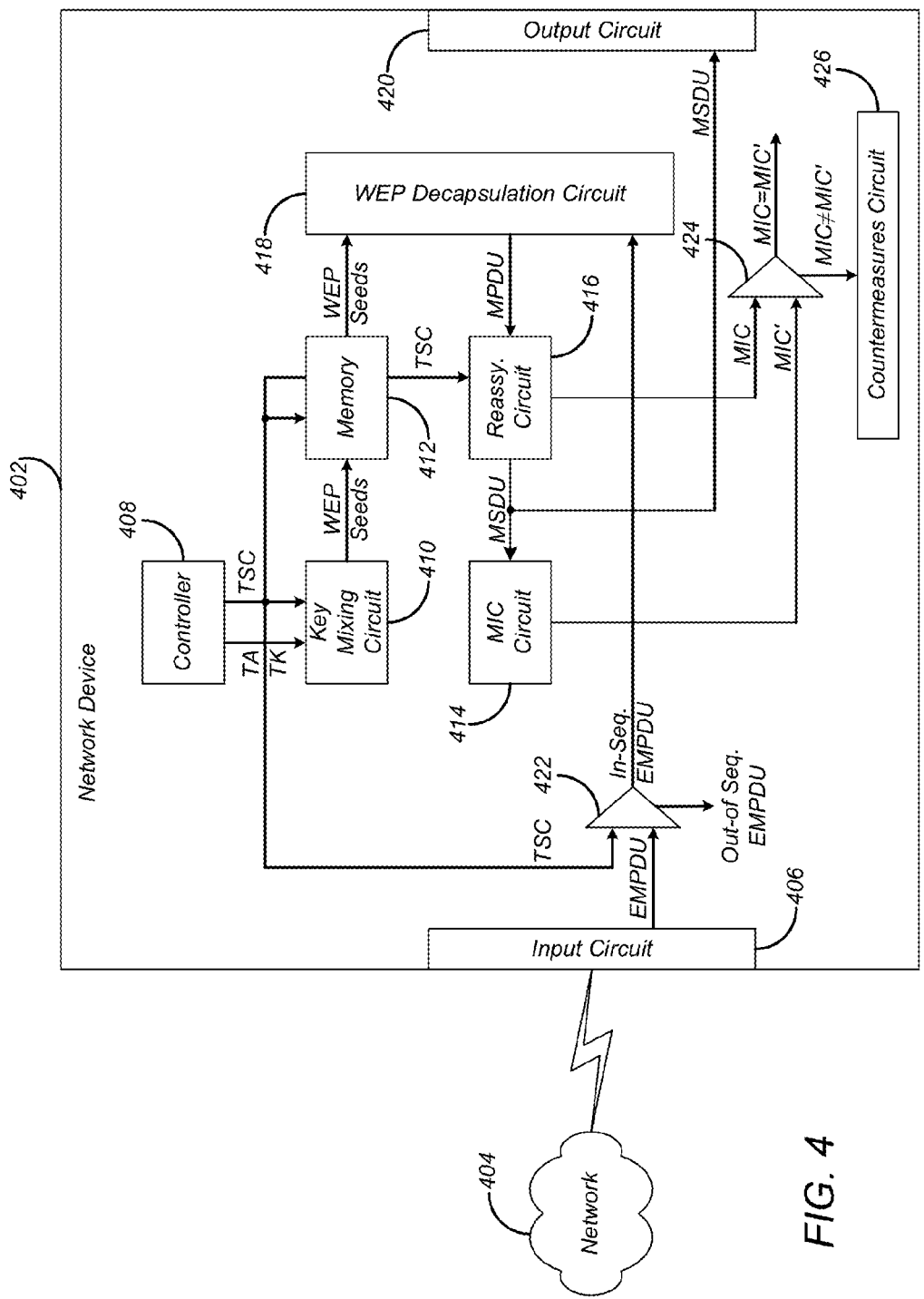
FIG. 4 shows a network device in communication with a network such as a WLAN according to a preferred embodiment.

FIG. 4 shows a network device 402 in communication with a network 404 such as a wireless local-area network (WLAN) according to a preferred embodiment. Network device 402 comprises an input circuit 406, a controller 408, a key mixing circuit 410, a memory 412, a Message Integrity Code (MIC) circuit 414, a reassembly circuit 416, a WEP decapsulation circuit 418, an output circuit 420, optional comparators 422 and 424, and an optional countermeasures circuit 426. According to some embodiments, network device 402 is compliant with IEEE standards 802.11i, and is otherwise compliant with one or more of IEEE standards 802.11 (1999 Edition), 802.11a (1999 Edition; Amended 2000), 802.11b (16 Sep. 1999 Edition), 802.11g (April 2003), 802.11n, 802.16 (2004), and 802.20-PD-06 (Jul. 16, 2004), the disclosures thereof incorporated herein by reference in their entirety.

Figure 5:
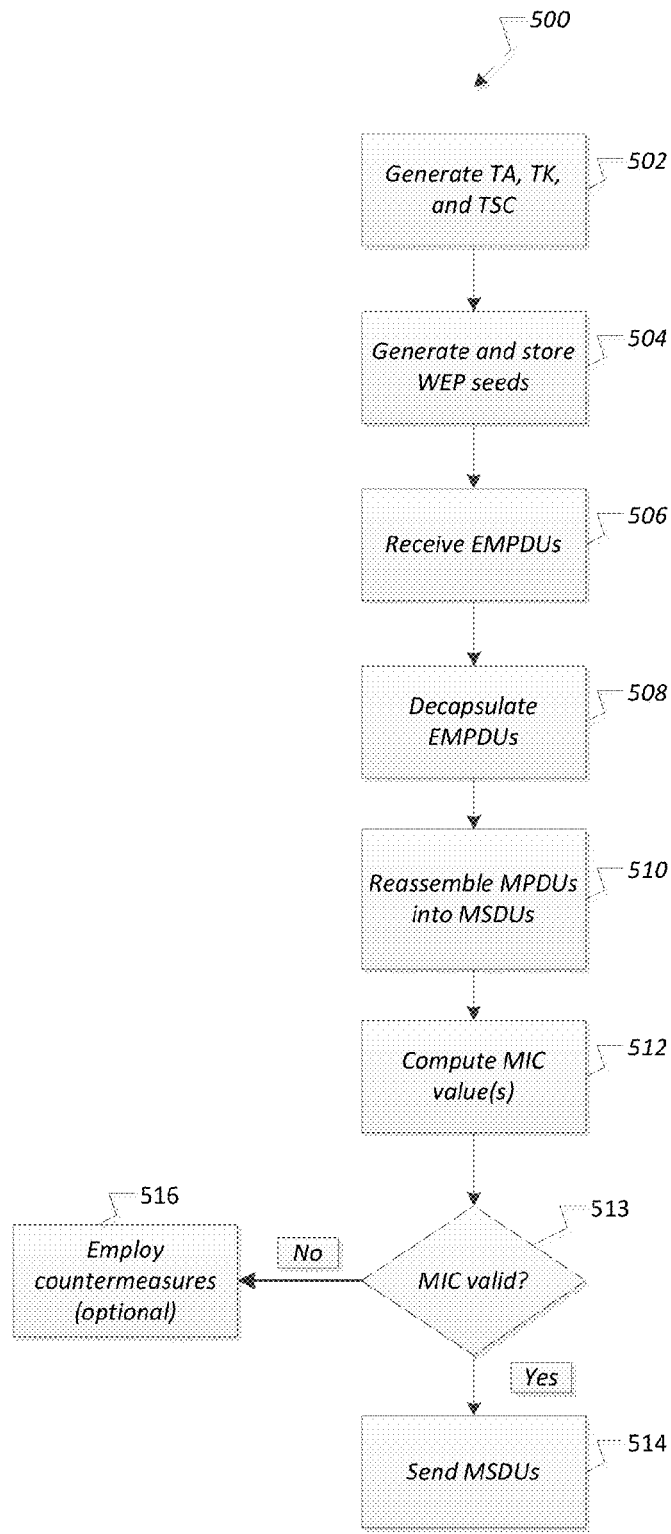
FIG. 5 shows a pipelined two-stage reception and decapsulation process for network device of FIG. 4 according to a preferred embodiment.

FIG. 5 shows a pipelined two-stage reception and decapsulation process 500 for network device 402 of FIG. 4 according to a preferred embodiment. In the second of the two stages, each of N encapsulated MPDUs (EMPDUs) are decapsulated using one of N WEP seeds. The first stage of the process generates the N WEP seeds ahead of time so they are ready when the second stage begins.

Referring to FIG. 5, controller 408 provides a transmitter MAC address TA, a temporal key TK, and at least a start value for a Temporal Key Integrity Protocol (TKIP) Sequence Count (TSC) to key mixing circuit 410 (step 502). The transmitter MAC address TA is a MAC address for the network device transmitting the MPDUs. The temporal key TK is a key that is negotiated in advance by network device 402 and the network device transmitting the MPDUs, as is well-known in the relevant arts. The TSC is a counter for the MPDUs to ensure sequential reception, as described in detail below.

In some embodiments, the network device transmitting the MPDUs first transmits a pipelining setup message such as the pipelining setup message described above with reference to FIG. 3 before transmitting the MPDUs. Network device 402 then extracts TA and the start value for TSC from the pipelining setup message.

In other embodiments, network device 402 generates TA and the start value for TSC without the use of a pipelining setup message. For example, network device 402 can generate a set of WEP seeds for one or more of the known transmitters in network 404 using TSC values that are assumed or tracked by monitoring network traffic. In some embodiments, each network device maintains a separate TSC counter for each of the other network devices. The network devices can set TSC=1 on network initialization, association with the corresponding network device, and the like, to ensure that their TSC counters remain synchronized. In such embodiments, no pipelining setup message is needed.

Key mixing circuit 410 generates each of the N WEP seeds based upon temporal key TK, transmitter MAC address TA, and the start value for TSC, and stores the N WEP seeds in memory 412 (step 504). Preferably key mixing circuit 410 generates a WEP seed for N sequential values of TSC beginning with the start value provided by controller 408, although other methods could be used. The start value for TSC is preferably initialized to one (TSC=1) during initialization of network device 402, and is incremented for each WEP seed generated.

Input circuit 406 subsequently receives N EMPDUs (step 506). For example, input circuit 406 can comprise a wireless physical-layer device (PHY) and antenna. As another example, input circuit 406 can be a MAC input circuit that receives the EMPDUs from a separate PHY and antenna in communication with network 404.

Optional comparator 322 checks the value of TSC in each EMPDU against the expected value. Out-of-sequence EMPDUs are discarded. In-sequence EMPDUs are provided to WEP decapsulation circuit 418.

WEP decapsulation circuit 418 decapsulates each of the N EMPDUs using the one of the N WEP seeds that was generated based on the value for the TSC in the respective one of the N EMPDUs (step 508). For example, WEP decapsulation circuit 418 receives an EMPDU and receives the corresponding WEP seed from memory 412, and performs the decapsulation according to methods well-known in the relevant arts to produce a decapsulated MPDU. Reassembly circuit 416 reassembles the N MPDUs to produce the original MSDUs (step 510).

MIC circuit 414 computes a MIC value for each MSDU based upon a MIC key (step 512). Optional comparator 324 checks the value of TSC in each MSDU against the computed value (step 513). If the MIC values are equal, output circuit 420 sends the MSDU (step 514), for example to a host unit or processor within network device 402. Otherwise, optional countermeasures circuit 326 employs one or more countermeasures (step 516) such as those described in IEEE standard 802.11i (April 2004).

According to process 500, key mixing circuit 410 generates each of the N WEP seeds before input circuit 406 receives the MSDUs. Therefore each WEP seed is available when the corresponding EMPDU arrives at WEP decapsulation circuit 418. This pipelining process ensures that no time is wasted in waiting for a WEP seed to be generated after receiving the corresponding EMPDU.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
   a first circuit configured to receive one or more of a plurality of first packets from a host unit or a processor of the network device;
   a second circuit configured to
   generate a plurality of second packets based on the plurality of first packets, and insert, in each of the plurality of second packets, a different value for a count;
   a third circuit configured to
   generate a plurality of seeds,
   wherein each of the plurality of seeds is based on (i) a first predetermined key, (ii) an address of the network device, and (iii) a predetermined value for the count;
   a fourth circuit configured to encapsulate each of the plurality of second packets using one of the plurality of seeds generated based on the value for the count in the respective one of the plurality of second packets; and
   a fifth circuit configured to
   send to an antenna of the network device a message comprising (i) the address of the network device and (ii) the predetermined value for the count; and
   send to the antenna, subsequent to sending the message, the plurality of encapsulated second packets.

2. The network device of claim 1, wherein the third circuit is configured to generate the plurality of seeds prior to the first circuit receiving the one or more of the plurality of first packets.

3. The network device of claim 1, wherein the message further comprises a number indicating a total number of the plurality of second packets.

4. The network device of claim 1, further comprising a sixth circuit configured to:
   generate, based on a second predetermined key, a code for each of the plurality of first packets; and
   insert the code into a respective one of the plurality of first packets prior to the first second circuit generating the plurality of second packets.

5. The network device of claim 1, wherein each value for the count is greater than or equal to the predetermined value for the count.

6. The network device of claim 1, wherein the first predetermined key comprises a key negotiated in advance by the network device and a link partner.

7. The network device of claim 1, wherein the fifth circuit is configured to send, via the antenna, (i) the plurality of encapsulated second packets and (ii) the message to a link partner of the network device.

8. The network device of claim 1, wherein the network device comprises a wireless network device that is at least partially compliant with at least one standard selected from the group consisting of IEEE standards 802.11, 802.11a, 802.11b, 802.11g, 802.11n, 802.16, and 802.20.

9. The network device of claim 1, wherein the network device comprises a wireless network device that is compliant with IEEE standard 802.11i.

10. A method comprising:
    receiving one or more of a plurality of first packets from a host unit or a processor of a network device;
    generating, at the network device, a plurality of second packets based on the plurality of first packets;
    inserting, in each of the plurality of second packets, a different value for a count;
    generating a plurality of seeds, wherein each of the plurality of seeds is based on (i) a first predetermined key, (ii) an address of the network device, and (iii) a predetermined value for the count;
    encapsulating each of the plurality of second packets using one of the plurality of seeds generated based on the value for the count in the respective one of the plurality of second packets;
    sending to an antenna of the network device a message comprising (i) the address of the network device and (ii) the predetermined value for the count; and
    sending to the antenna, subsequent to sending the message, the plurality of encapsulated second packets.

11. The method of claim 10, further comprising generating the plurality of seeds prior to receiving the one or more of the plurality of first packets.

12. The method of claim 10, wherein the message further comprises a number indicating a total number of the plurality of second packets.

13. The method of claim 10, further comprising:
    generating, based on a second predetermined key, a code for each of the plurality of first packets; and
    inserting the code into a respective one of the plurality of first packets prior to generating the plurality of second packets.

14. The method of claim 10, wherein each value for the count is greater than or equal to the predetermined value for the count.

15. The method of claim 10, further comprising negotiating the first predetermined key with a link partner in advance.

16. The method of claim 10, further comprising sending, via the antenna, (i) the plurality of encapsulated second packets and (ii) the message to a link partner.

17. The method of claim 10, wherein the network device comprises a wireless network device that is at least partially compliant with at least one standard selected from the group consisting of IEEE standards 802.11, 802.11a, 802.11b, 802.11g, 802.11n, 802.16, and 802.20.

18. The method of claim 10, wherein the network device comprises a wireless network device that is compliant with IEEE standard 802.11i.

\* \* \* \* \*